(12) United States Patent
Travis (10) Patent No.: US 9,752,554 B2
(45) Date of Patent: *Sep. 5, 2017

(54) APPARATUS UTILIZING BUOYANCY FORCES

(71) Applicant: Wayne S. Travis, Chickasha, OK (US)

(72) Inventor: Wayne S. Travis, Chickasha, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 15/082,452

(22) Filed: Mar. 28, 2016

(65) Prior Publication Data

US 2016/0208769 A1    Jul. 21, 2016

Related U.S. Application Data

(63) Continuation of application No. 14/057,154, filed on Oct. 18, 2013, now Pat. No. 9,297,353.

(60) Provisional application No. 61/716,213, filed on Oct. 19, 2012.

(51) Int. Cl.
*F03B 13/18* (2006.01)
*F03B 17/02* (2006.01)
*F03B 17/06* (2006.01)

(52) U.S. Cl.
CPC .............. *F03B 17/02* (2013.01); *F03B 17/06* (2013.01); *Y02E 10/20* (2013.01); *Y02E 10/28* (2013.01); *Y02E 10/38* (2013.01); *Y10T 137/6851* (2015.04)

(58) Field of Classification Search
CPC .......... F03B 17/02; F03B 17/06; Y02E 10/20; Y02E 10/28; Y10T 137/6851
See application file for complete search history.

(56) References Cited

U.S. PATENT DOCUMENTS

| 6,803,670 B2 | 10/2004 | Peloquin |
| 2010/0066084 A1 | 3/2010 | Ehrnberg |
| 2010/0115940 A1 | 5/2010 | Propp |
| 2011/0041499 A1 | 2/2011 | Godwin |

FOREIGN PATENT DOCUMENTS

WO          03/089767          10/2003

OTHER PUBLICATIONS

International Search Report and Written Opinion (PCT/US2013/065608); Feb. 7, 2014.

*Primary Examiner* — Jesse Bogue
(74) *Attorney, Agent, or Firm* — Dunlap Codding, P.C.

(57) ABSTRACT

An apparatus has a base and a flow path assembly movably supported by the base and defining a serpentine flow path having an entry opening and an exit opening. An actuator is coupled with the flow path assembly and the base and is configured to rotate the flow path assembly between a vertical and an angled position relative to the base. The flow path is configured to allow a column of a first fluid with a first density to be trapped between columns of a second fluid with a second density higher than the first density. The first fluid column has a first height and the second fluid columns have second heights, so that a volume of the first fluid and a volume of the second fluid flow through the flow path and through the exit opening as the flow path assembly is rotated between the vertical and angled positions.

13 Claims, 8 Drawing Sheets

APPARATUS UTILIZING BUOYANCY FORCES

CROSS REFERENCE TO RELATED APPLICATIONS

This application is a continuation of U.S. application Ser. No. 14/057,154, filed on Oct. 18, 2013, which claims priority to U.S. Provisional Application Ser. No. 61/716,213, filed on Oct. 19, 2012; the entirety of each being hereby expressly incorporated herein by reference.

BACKGROUND

The inventive concepts disclosed herein generally relate to an apparatus for utilizing buoyancy forces and to methods of using the same. More particularly, but not by way of limitation, the inventive concepts disclosed herein relate to an apparatus for utilizing buoyancy forces by multiplying the lift of several alternating columns of a first fluid and a second fluid over several surfaces, and to methods of using the same.

The properties of buoyancy have been explored as a source of renewable or "green" energy because of the ability to use buoyancy forces in existing bodies of water without generating additional environmental pollution and greenhouse gases.

Existing prior art buoyancy devices typically depend on utilizing the buoyancy energy of waves, or moving waters, and as such have limited applications, as they must be installed at certain locations where waves or moving waters are available in order to work. Further, such prior art devices do not produce a consistent level of power, as the power output of such prior art devices is subject to fluctuations in waves, tides, and to seasonal water level variations.

Another problem with currently existing buoyancy devices is that they are often complicated and have multiple components, which require frequent maintenance and replacement, and are expensive to implement and operate. Further, such complicated devices often suffer from low efficiency and are generally unreliable due to their overcomplicated designs.

SUMMARY

In one aspect, the inventive concepts disclosed herein are directed to an apparatus including a base and a flow path assembly movably supported by the base and defining a substantially serpentine flow path having an entry opening and an exit opening. An actuator is coupled with the flow path assembly and with the base, the actuator configured to rotate the flow path assembly between a substantially vertical position and an angled position relative to the base. The substantially serpentine flow path is configured to allow a column of a first fluid with a first density to be trapped between two columns of a second fluid with a second density higher than the first density, the first fluid column having a first height and the second fluid columns having second heights, so that a first volume of the first fluid and a second volume of the second fluid flow in and out the serpentine flow path through the exit opening as the flow path assembly is rotated between the substantially vertical position and the angled position.

In a further aspect, the inventive concepts disclosed herein are directed to an apparatus including a base and a frame movably supported by the base. The frame has a first side and a second side cooperating to define a rotation plane and a rotation axis extending substantially parallel to the rotation plane, the frame being rotatable between a substantially vertical position and an angled position about the rotation axis.

An actuator assembly is coupled with the frame and with the base and is configured to rotate the frame about the rotation axis between the substantially vertical position and the angled position relative to the base.

A flow path assembly includes a first conduit having a first upper end and a first lower end and being connected to the frame so that the first conduit extends substantially vertically when the frame is in the substantially vertical position. A second conduit having a second upper end and a second lower end is connected to the frame so that the second conduit extends substantially vertically when the frame is in the substantially vertical position. A third conduit having a third upper end and a third lower end is connected to the frame so that the third conduit extends substantially vertically when the frame is in the substantially vertical position. A fourth conduit having a fourth upper end and a fourth lower end is connected to the frame so that the fourth conduit extends substantially vertically when the frame is in the substantially vertical position.

The flow path assembly also has a first connector conduit fluidly connected with the first lower end of the first conduit and the second lower end of the second conduit, the first connector conduit having a first fluid passage formed therein and configured to allow one or more fluids to be introduced into, or removed from, the first and the second conduits. A second connector conduit is fluidly connected with the second upper end of the second fluid conduit and the third upper end of the third conduit, the second connector conduit having a second fluid passage formed therein and configured to allow one or more fluids to be introduced into or removed from the second connector conduit. A third connector conduit is fluidly connected with the third lower end of the third conduit and the fourth lower end of the fourth conduit, the third connector conduit having a third fluid passage formed therein and configured to allow one or more fluids to be introduced into or removed from the third connector conduit. An exit conduit is fluidly connected with the fourth upper end such that the first, second, third, and fourth conduits, the first, second, and third connector conduits, and the exit conduit, cooperate to define a substantially serpentine flow path.

The substantially serpentine flow path is configured to allow a column of a first fluid with a first density to be trapped between two columns of a second fluid with a second density higher than the first density, the first fluid column having a first height and the second fluid columns having second heights, so that a first volume of the first fluid and a second volume of the second fluid flow in and out the serpentine flow path through the exit conduit as the frame is rotated between the substantially vertical position and the angled position.

BRIEF DESCRIPTION OF THE DRAWINGS

Like reference numerals in the figures may represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way, unless expressly stated to the contrary.

In the following detailed description of embodiments of the inventive concepts, numerous specific details are set forth in order to provide a more thorough understanding of the inventive concepts. However, it will be apparent to one of ordinary skill in the art that the inventive concepts disclosed herein may be practiced without these specific details. In some instances, well-known features have not been described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the instant inventive concepts in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one, and the singular also includes the plural, unless it is obvious that it is meant otherwise.

As used herein, the term "fluid," and any variations thereof, is intended to include a compressible or a substantially non-compressible fluid (e.g., gas or liquid), such as water, mineral oil, mercury, metals, plant-based oils, animal-based oils, petroleum-based oils, synthetic oils, alcohols, solutions, suspensions, gels, viscous liquids, liquid chemicals, vapors, liquefied gasses, semi-solids or solids, and combinations thereof, for example. The term "fluid" is not necessarily intended to be understood as an absolute term, and may refer to a substance being a fluid at a range of pressures, temperatures, or other operating conditions typically encountered by an apparatus constructed according to the inventive concepts disclosed herein.

As used herein the terms "compressible" and "substantially non-compressible" are not necessarily intended to be understood as absolute terms, and may refer to the fluid being compressible or non-compressible at a range of pressures, temperatures, or other operating conditions typically encountered by an apparatus constructed according to the inventive concepts disclosed herein.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In exemplary embodiments of the inventive concept disclosed herein an apparatus may be configured to change the pressure in a controlled volume of a first fluid having a first density positioned between two columns of a second fluid having a second density which is larger than the first density. The apparatus may include a tilting or rotating frame rotatably supported by a base. The frame may be rotatable between a substantially vertical position and an angled or tilted position. The two fluids may be placed in a conduit attached to the frame, the conduit forming two or more loops and defining an overall substantially serpentine (or substantially S-shaped) flow path, with columns of the first fluid and the second fluid alternating with one another in the serpentine flow path so as to trap one or more columns of the first fluid between one or more columns of the second fluid. Alternatively, the two fluids may be placed in a flow path defined by the frame, such as a molded frame defining an overall substantially serpentine (or substantially S-shaped) flow path, with columns of the first fluid and the second fluid alternating with one another in the serpentine flow path so as to trap one or more columns of the first fluid between one or more columns of the second fluid. In some exemplary embodiments, the first fluid may be a gas, such as air, and the second fluid may be a liquid, such as water.

As the frame is rotated from the substantially vertical position towards the angled position, the fluid column heights of the first fluid and the second fluid decrease, so as to decrease the pressures exerted by the alternating columns of the first fluid and the second fluid onto one another. As the frame is rotated from the angled position towards the substantially vertical position, the fluid column heights of the first and the second fluid increase, so as to increase the pressures exerted by the alternating columns of the first fluid and the second fluid onto one another. A volume of the first or the second fluid may be withdrawn from or may flow out of the apparatus when the frame is in the substantially vertical position (e.g., the fluids are at relatively high pressures), and a volume of the first or second fluid may be introduced or may flow into the apparatus when the frame is in the angled position (e.g., the fluids are at relatively low pressures).

It is to be understood that the first fluid and the second fluid may be liquids, liquid metals, gels, gasses, liquefied gasses, solutions, suspensions, viscous slurries, emulsions, foams, gels, porous solids or semi-solids, and combinations or mixtures thereof, including a mixture of two or more liquids, fluids, gasses, or solids or semi-solids. Further, in some exemplary embodiments the first fluid and the second fluid may be substantially non-compressible, while is some exemplary embodiments the first fluid may be substantially non-compressible and the second fluid may be compressible, the first fluid may be compressible, and the second fluid may be substantially non-compressible, or both the first and the second fluid may be compressible.

The inventive concepts disclosed herein will be described in detail in connection with exemplary embodiments in which the first fluid is air, and the second fluid is water. It is to be understood that the inventive concepts disclosed herein are not limited to using water or air, and may be implemented with any suitable first fluid (or mixture of fluids) having a first density, and second fluid (or mixture of fluids) having a second density, where the first density and the second density are different from one another, regardless of whether the first density is larger than, or smaller than the second density. Such first and second fluids may be compressible or substantially incompressible fluids, for example.

The greater the difference between the first density and the second density, the greater the efficiency of an apparatus according to the inventive concepts disclosed herein is expected to be. As a practical matter, using two substantially non-compressible fluids having a relatively large density difference would be expected to result in a higher efficiency, than using two compressible fluids having a relatively small density difference.

However, practical consideration may favor designing an apparatus according to the inventive concepts disclosed herein that uses cheap, safe, and readily available fluids such as air and water, for example, to minimize the cost of constructing and operating the apparatus, disposing of fluids during set-up, maintenance, transport, or repair of the apparatus, and to avoid using fluids that may be hazardous to people, animals, or the environment, for example. Similarly, where an apparatus according to the inventive concepts disclosed herein is to be installed in environments where freezing or hot temperatures are expected, the first and second fluids selected may be freeze-resistant, or evaporation-resistant, for example.

As another example, inert gasses may be implemented as the first or the second fluid, instead of atmospheric air, such as argon, helium, nitrogen, carbon dioxide, and combinations thereof, for example. Further, a variety of chemical or biocidal additives may be added to the fluids used with an apparatus according to the inventive concepts disclosed herein, so as to prevent the growth of organisms inside the apparatus, such as bacteria, for example.

Figure 1:
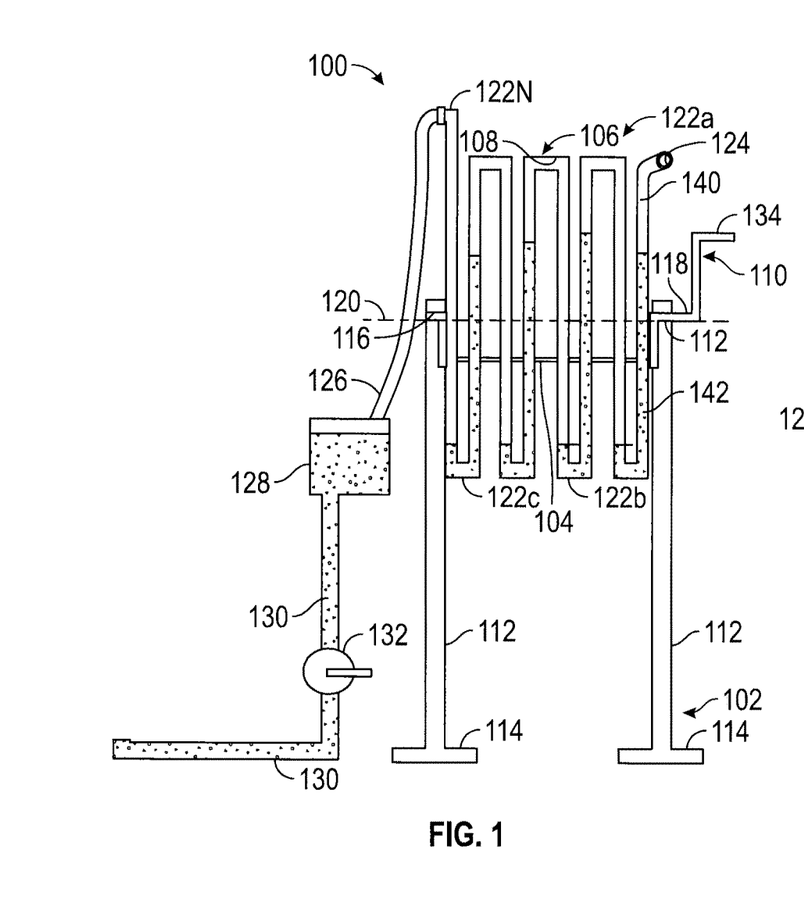
FIG. 1 is a perspective view diagram of an exemplary embodiment of a tiltable apparatus according to the inventive concepts disclosed herein.
Figure 2:
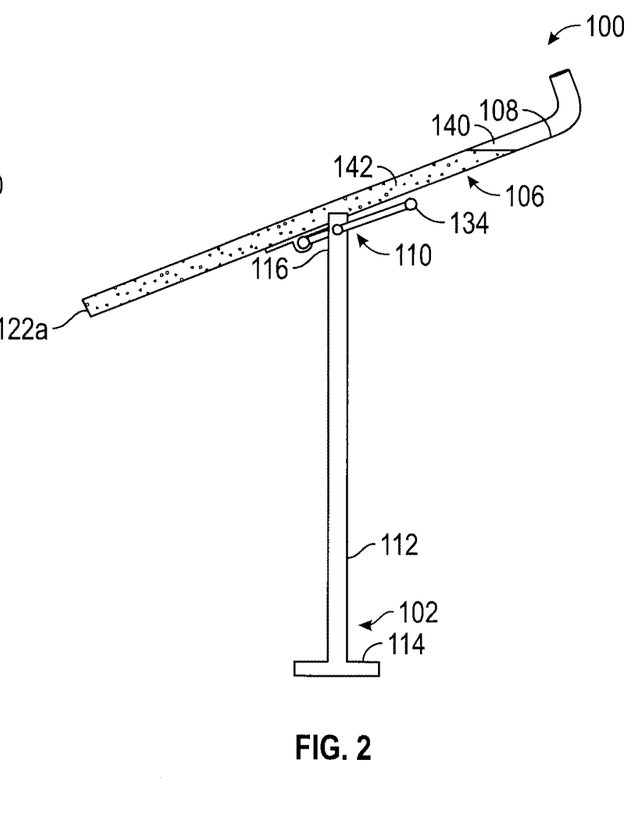
FIG. 2 is a side view diagram of the apparatus of FIG. 1.

Referring now to FIGS. 1-2, an exemplary embodiment of an apparatus 100 constructed in accordance with the inventive concepts disclosed herein may include a support assembly 102, a frame assembly 104 rotatably supported by the support assembly 102, a flow path assembly 106 connected to the frame assembly 104 and defining a substantially S-shaped or serpentine flow path 108, and an actuator assembly 110 operably coupled with the frame assembly 104 and configured to tilt or rotate the frame assembly 104 relative to the support assembly 102.

The support assembly 102 may include two or more support members 112 extending substantially vertically from a base 114. While the two or more support members 112 are shown as extending substantially vertically from the base 114 and as being substantially parallel to one another, in some exemplary embodiments the two or more support members 112 may be oriented at any desired angle towards one another and relative to the base 114. The two or more support members 112 may have openings 116 formed therein, the openings 116 adapted to rotatably receive a shaft 118 of the frame assembly 104 therein. It is to be understood that in some exemplary embodiments one support member 112 or more than two support members 112 may be used with the inventive concepts disclosed herein.

The support assembly 102 may be constructed of any suitable material configured to support the weight of the frame assembly 104, the flow path assembly 106, and the actuator assembly 110, for example. Suitable materials of which the support assembly 102 may be constructed in some exemplary embodiments may include metals, non-metals, resilient plastics, alloys, polymers, steel, aluminum, titanium, resins, wood, or combinations thereof, for example.

The frame assembly 104 may be implemented as any suitable frame assembly 104 configured to support the weight of the flow path assembly 106 so that the flow path assembly 106 may be rotated or tilted relative to the support assembly 102, for example. The frame assembly 104 may include a shaft 118 rotatably connected with the two or more support members 112 of the support assembly 102, for example. The shaft 118 may be rotatably connected to the two or more support members 112 in any suitable manner, including via bearings (not shown), fittings (not shown), flanges (not shown), or combinations thereof, for example, and the shaft 118 may at least partially or completely extend through the two or more support members 112 in some exemplary embodiments.

The frame assembly 104 may further have a rotation axis 120 (FIG. 1), such that the shaft 118 extends along the rotation axis 120 in some exemplary embodiments. The rotation axis 120 may extend substantially through a center of gravity (not shown) of the frame assembly 104, such that rotating the frame assembly 104 about the rotation axis 120 may be achieved easily and cheaply in terms of energy. It so be understood that due to shifting columns of fluid in the flow path 108, the actual center of gravity of the frame assembly 104 may shift during tilting or rotation of the frame assembly 104 about the rotation axis 120.

The frame assembly 104 may be constructed of any suitable material, such as metals, steel, aluminum, titanium, alloys, resilient plastic, thermoset materials, resins, non-metals, or combinations thereof, for example.

The flow path assembly 106 may be implemented as any suitable flow path assembly 106 defining a substantially S-shaped or substantially serpentine flow path 108. For example, as shown in FIGS. 1-2, the flow path assembly 106 may include a plurality of substantially U-shaped conduits 122*a-n* fluidly connected in series and alternating in orientation relative to one another, so as to cooperate and define the substantially S-shaped flow path 108. A first conduit 122*a-n* may have an entry opening 124 which may be open to the atmosphere, and a second conduit 122*a-n* may be fluidly connected with an exit conduit 126, for example. The conduits 122*a-n* may have any desired size, shape, cross-section, construction, or combinations thereof, for example.

It is to be understood that while four conduits 122*a-n* are shown in FIG. 1, the inventive concepts disclosed herein may be implemented with any desired number of conduits 122*a-n*, such as two, three, five, six, or more conduits 122*a-n* fluidly connected with one another so as to cooperate and define the substantially S-shaped flow path 108, for example. Further, while the conduits 122*a-n* are shown as being substantially coplanar with one another, in some exemplary embodiments two or more conduits 122*a-n* may be non-coplanar, and may be angled relative to one another at any angle such as an angle varying between about 0° and about 90°, for example.

It is to be understood that while the flow path assembly 106 has been described herein as including conduits 122*a-n* connected to the frame assembly 104, the inventive concepts disclosed herein are not limited to using conduits 122*a-n*. For example, in some embodiments, the flow path assembly 106 may be implemented as a molded-type flow path assembly 106 defining an internal substantially S-shaped flow path 108, for example. In some exemplary embodiments, the flow path assembly 106 may be injection molded, cast, machined, molded, or combinations thereof, and may be constructed of any suitable materials such as metals, alloys, non-metals, polymers, thermoplastics, plastics, fibrous materials, carbon fiber, or combinations thereof.

The conduits 122*a-n* may be implemented as any suitable conduits 122*a-n*, such as pipes, hoses, or other desirable conduits 122*a-n*, and may be made of any desired material, such as PVC, plastics, Plexiglas, metals, alloys, non-metals, resins, or combinations thereof. In some exemplary embodiments of the inventive concepts disclosed herein, at least a portion of the conduits 122*a-n* may be substantially transparent, such that a height of the first fluid column 140 and the second fluid column 142 inside the conduits 122*a-n* may be visually observed. In an exemplary embodiment of the inventive concepts disclosed herein, the conduits 122 may be substantially opaque, and one or more sight port (not shown), sight glass (not shown), fluid-level gauge (not shown), another fluid-level indicating device, or combinations thereof, may be implemented to monitor the heights of the first fluid columns 140 and the second fluid columns 142 inside the conduits 122*a-n*.

Further, in some exemplary embodiments of the inventive concepts disclosed herein, the flow path assembly 106 and the frame assembly 104 may be formed as a unitary body, for example, by incorporating the shaft 118 into the flow path assembly 106, as will be appreciated by persons of ordinary skill in the art having the benefit of the instant disclosure.

The exit conduit 126 may be fluidly connected with an optional tank 128. The optional tank 128 may be fluidly connected with an output conduit 130, which may be selectively partially or substantially completely closed by a valve 132, for example. It is to be understood that in some exemplary embodiments the tank 128 may be omitted and the exit conduit 126 may be fluidly connected to any desired vessel, conduit, system, assembly, tank, or combinations thereof. Further, in some exemplary embodiments, the valve 132 may be omitted, or may be replaced with any suitable mechanism configured to selectively allow a fluid to flow through the output conduit 130, or to selectively substantially prevent a fluid from flowing through the output conduit 130, as will be readily appreciated by a person of ordinary skill in the art having the benefit of the instant disclosure.

The flow path assembly 106 may be connected to the frame assembly 104 in any suitable manner, such as via using adhesives, bolts, clamps, brackets, flanges, screws, welds, seams, joints, or combinations thereof, so that the flow path assembly 106 may be supported by the frame assembly 104 and may rotate relative to the support assembly 102 along with the frame assembly 104, for example.

In the exemplary embodiment of FIGS. 1-2, the actuator assembly 110 is shown as a lever 134 connected to the shaft 118 of the frame assembly 104. The lever 134 may be operated to tilt the frame assembly 104 relative to a horizontal plane at any desired angle (e.g., between about 0° and about 180°), as will be described below. The actuator assembly 110 is configured to selectively pivot, tilt, rotate, or otherwise move the frame assembly 104 and the flow path assembly 106 relative to a horizontal plane (not shown), so as to move the flow path 108 between a substantially vertical position where the flow path 108 is substantially perpendicular to the horizontal plane, and an angled position, wherein the flow path 108 is angled relative to the horizontal plane (e.g., at an angle different from about 90°), for example.

It is to be understood that an actuator assembly 110 according to the inventive concepts disclosed herein may be implemented as any suitable actuator assembly 110, including a manual, a hydraulic, a pneumatic, a mechanical, a magnetic, an electrical actuator assembly 110, or combinations thereof, for example. The actuator assembly 110 has been described as a manual actuator assembly 110 for purposes of clarity and simplicity only, and is not limited to a manual actuator assembly 110. In a commercial implementation of an apparatus 100 according to the inventive concepts disclosed herein, the actuator assembly 110 may be automated and may be controlled by a processor executing processor executable code stored in a non-transitory computer medium, for example.

The apparatus 100 may be configured to change the pressure in a controlled volume of fluid between a specified high and low pressure quickly and easily through a reversible and repeatable process. In some exemplary embodiments, the apparatus 100 may be set up and may operate as follows:

The one or more first fluid column 140 and one or more second fluid column 142 may be positioned in the flow path 108, so that the first fluid column 140 and the second fluid column 142 alternate with one another, such that a first fluid column 140 is trapped between two second fluid columns 142, for example. The first fluid may have a first density, and the second fluid may have a second density, such that the first density is lower than the second density, so that the first fluid column 140 may be trapped between, surrounded by, or positioned between, two second fluid columns 142, for example. As can be seen in FIG. 1, the heights of the one or more first fluid column 140 and the heights of the one or more second fluid column 142 may differ between the conduits 122a-n, and are not necessarily equal in each conduit 122a-n, for example.

The apparatus 100 may be initialized by filling alternating conduits 122a-n between about 50% and about 95% and between about 5% and about 50% full of the second fluid, respectively. In some exemplary embodiments, the conduits 122a-n may be filled to any desired volume or amount, such as between about 0% and about 100%, and any ranges and sub-ranges therebetween. The exact second fluid column 142 heights in each of the conduits 122a-n are dependent on the pressure desired to be outputted by the apparatus 100.

Next, a volume of the first fluid may be injected or otherwise introduces into the conduits 122a-n (e.g., via valves or ports), so that one or more first fluid columns 140 are positioned or trapped between two second fluid columns 142. The volume of the first fluid introduced may be varied for each conduit 122a-n, according to predetermined volumes, which may be marked on the apparatus itself (e.g., a scale, or sight-glass markings) or may be supplied with a manual or set-up procedure guide provided with the apparatus 100, for example. The volume of first fluid may be introduced into the conduits 122a-n in any order, such as sequentially, randomly, or semi-randomly, for example. This may result in a setup where the pressure in each conduit 122a-n is different throughout the apparatus 100 (e.g., the pressures increase from the entry opening 124 towards the exit conduit 126), with the initial pressure in the entry opening 124 being substantially atmospheric and the pressure inside the substantially S-shaped flow path 108 increasing in each subsequent alternating first fluid column 140 and second fluid column 142 to the desired final pressure at the exit conduit 126, for example. The final pressure at the exit conduit 126 may be substantially equal to the sum of the pressures of the first fluid columns 140 and second fluid columns 142 positioned in the substantially S-shaped flow path 108, for example.

While the pressure for the initial setup may be created by adding a first relatively less dense fluid (e.g., air or gas) into each conduit 122a-n, the pressure at any point in the apparatus 100 can easily be measured by visually inspecting differences in the heights of the second (relatively more dense) fluid columns 142 in a relatively high-pressure side and a relatively low-pressure side of each conduit 122a-n. The initial setup is designed to have enough pressure to produce the desired output pressure in the exit conduit 126, while also having enough extra second fluid column 142 height to ensure that during operation the second fluid is not able to flow over the top of the conduits 122a-n or for the first fluid to be pushed under the conduits 122a-n.

The apparatus 100 operates by changing the pressure of a column of fluid between two different values by being moved between the substantially vertical position (FIG. 1) and the angled position (FIG. 2). The pressure change may be a result of the changing gravity effects on the first fluid column 140 and the second fluid column 142 as their respective heights change when the apparatus 100 is rotated between the substantially vertical position shown in FIG. 1 and the angled position shown in FIG. 2. For example, the relatively maximum gravity effect on the height of the first fluid column 140 and the second fluid column 142 is exerted when the first fluid column 140 and the second fluid column 142 are in the substantially vertical position (FIG. 1), and the relatively minimum gravity effect on the first fluid column 140 and the second fluid column 142 is exerted when the first fluid column 140 and the second fluid column 142 are in an angled position (FIG. 2), e.g., where the fluid columns 140 and 142 are substantially horizontal. The pressure change is accomplished by tilting or rotating the apparatus 100 from the substantially vertical position to the angled position (e.g., between about 0° and about 90°, or between about 0° and about 108°) about the rotation axis 120. The exact angle of rotation between the substantially vertical position and the angled position may depend on the difference between the higher and lower pressures desired, for example.

This rotation of the flow path assembly 106 can be implemented via the actuator assembly 110. It is to be understood that any suitable actuator assembly 110 or method may be used to effect the rotation of the flow path assembly 106, and the optimal rotation may be dependent on the particular application for which the apparatus 100 is used. For example, a hydraulic actuator mechanism (not shown), a magnetic actuator mechanism (not shown), a mechanical actuator mechanism (not shown), a pneumatic actuator mechanism (not shown), and electrical actuator mechanism (not shown), or combinations thereof may be implemented.

After initialization, the apparatus 100 is operated by removing a volume of fluid from the tank 128 while the flow path assembly 106 is substantially in the vertical (or high-pressure) position. The actuator assembly 110 may then be operated to rotate the flow path assembly 106 to the low-pressure position, and a volume of the second fluid that is added back in to the apparatus 100 as after the flow path assembly 106 is moved towards the angled (or low-pressure) position. This process can be repeated for as long as desired.

Figure 3:
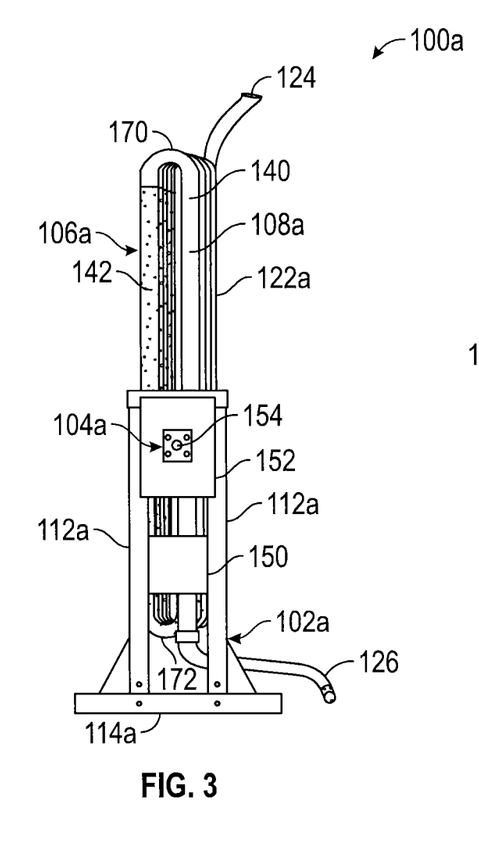
FIG. 3 is a perspective view diagram of an exemplary embodiment of a tiltable apparatus according to the inventive concepts disclosed herein shown in a substantially vertical position.
Figure 4:
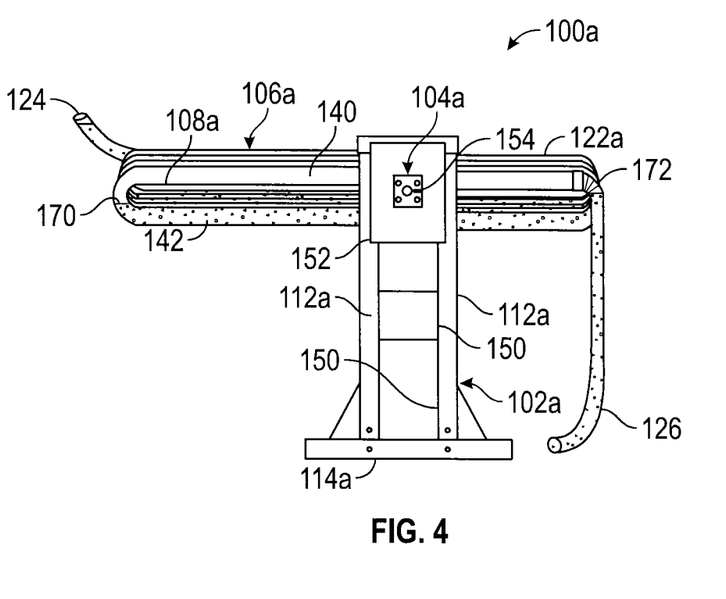
FIG. 4 is a perspective view diagram of the apparatus of FIG. 3 shown in a tilted position.

Referring now to FIGS. 3-4, an exemplary embodiment of an apparatus 100a according to the inventive concepts disclosed may be implemented and function similarly to the apparatus 100, and may include a support assembly 102a, a frame assembly 104a rotatably supported by the support assembly 102a, a flow path assembly 106a connected to the frame assembly 104a and defining a substantially S-shaped or serpentine flow path 108a, and an actuator assembly (not shown), such as the actuator assembly 110 may be operably coupled with the frame assembly 104a and configured to tilt or rotate the frame assembly 104a relative to the support assembly 102a, for example.

The support assembly 102a may be implemented similarly to the support assembly 102 and may include four or more support members 112a extending substantially vertically from a base 114a, for example. The support members 112a and the base 114a may be connected in any suitable manner, such as via fasteners, bolts, screws, welds, joints, seams, adhesives, brackets, clamps, or combinations thereof, for example.

Figure 5:
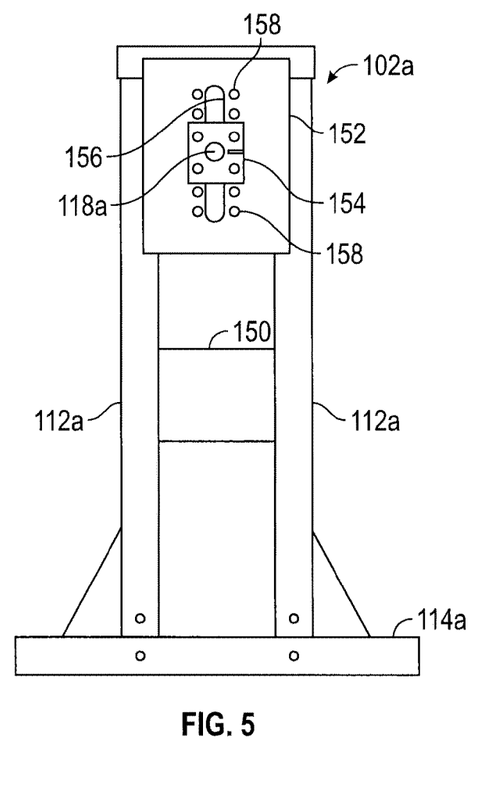
FIG. 5 is a side view diagram of an exemplary embodiment of a support assembly according to the inventive concepts disclosed herein.
Figure 6:
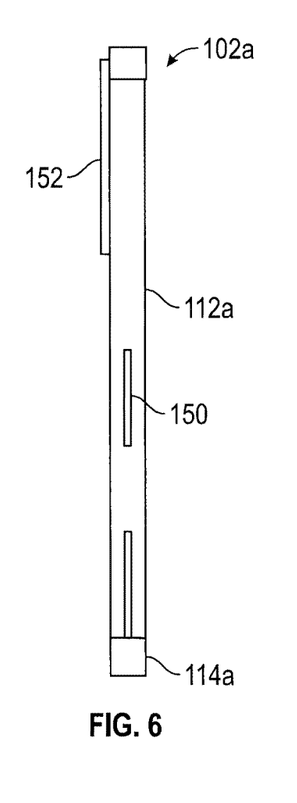
FIG. 6 is an end view of the support assembly of FIG. 5.

As can be seen in FIGS. 5-6, two support members 112a may be connected to a base 114a, but it is to be understood that each support member 112a may be connected to a base 114a, or three, four, or more support members 112a may be connected to a base 114a, for example. Further in some exemplary embodiments any desired number of support members 112a may be used, and in some exemplary embodiments the base 114a may be omitted. An optional stabilization plate (not referenced) may be used to securely connect the four support members 112a to the base 114a, for example.

One or more optional stabilizing plates 150 may be used to connect two or more support members 112a, so as to increase the rigidity and strength of the support assembly 102a, as will be appreciated by a person of ordinary skill in the art having the benefit of the instant disclosure.

A first and a second mounting plate 152 may be connected to two or more support members 112a (only one being shown in FIGS. 3-4), with the first and the second mounting plate 152 being oriented substantially parallel to one another and being supported by support members 112a at a distance from one another, for example, so as to allow the frame assembly 104a to be rotatably connected to the support assembly 102a.

A mounting bracket 154 (e.g., a bearing) may be implemented with each mounting plate 152 so as to rotatably receive a shaft 118a of the frame assembly 104a therein, for example. An elongated slot 156 may be formed in the mounting bracket 154 and may be configured to allow for the height of the mounting bracket 154 relative to the base 114a to be adjusted as desired. The mounting bracket 154 may further include a plurality of corresponding openings 158 formed adjacent to the slot 156 so that the position of the mounting brackets 154 on the first and the second mounting plates 152 may be correspondingly adjusted by securing a respective mounting bracket 154 at the same height on each mounting plate 152 (e.g., by inserting fasteners through the corresponding openings 158). It is to be understood that in some exemplary embodiment the mounting bracket 154 may be omitted, and the shaft 118a may be rotatably connected with the support assembly 102a in any desired manner, as will be appreciated by a person of ordinary skill in the art having the benefit of the instant disclosure.

Figure 7:
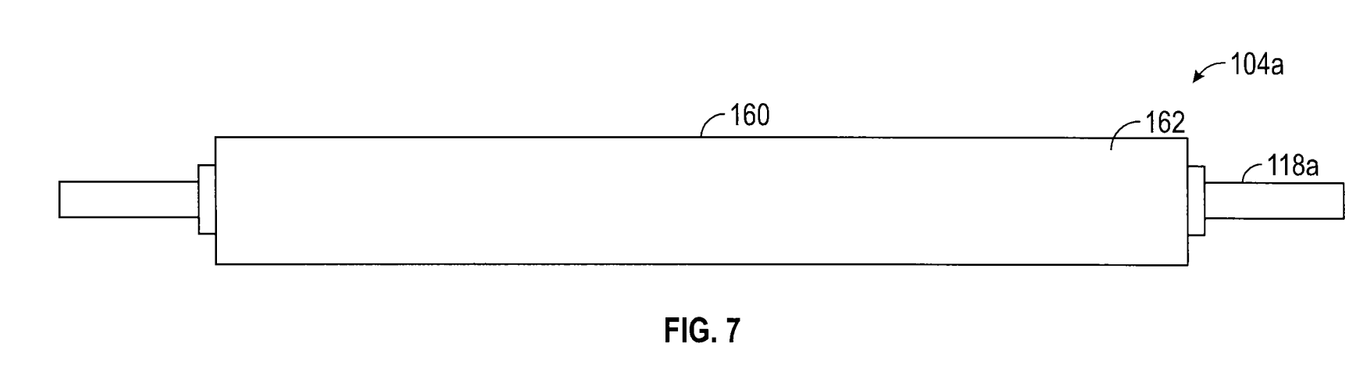
FIG. 7 is a side view diagram of a frame assembly according to the inventive concepts disclosed herein.
Figure 8:
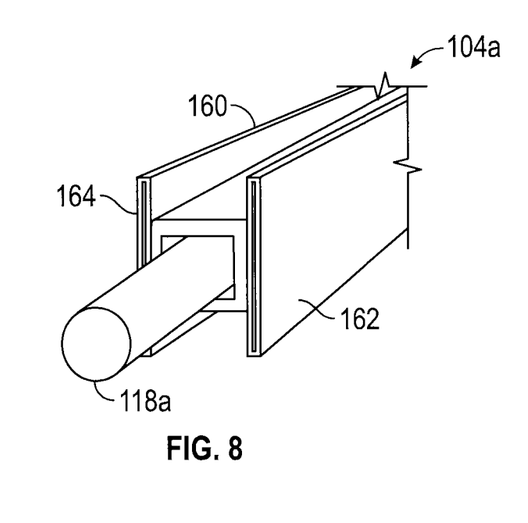
FIG. 8 is a partial perspective view of the frame assembly of FIG. 7.
Figure 9:
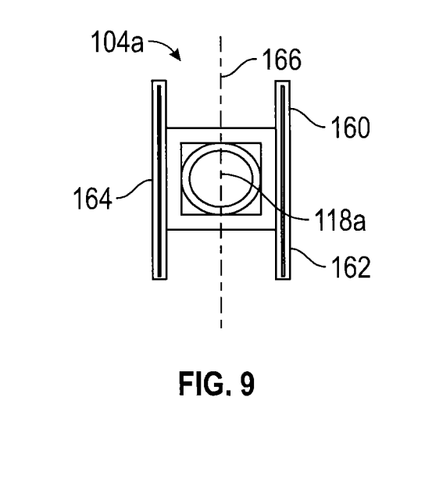
FIG. 9 is an end view of the frame assembly of FIG. 7.

Referring now to FIGS. 7-9, the frame assembly 104a may include a frame 160 rotatably supported by the shaft 118a, for example. The frame 160 may be fixedly or rotatably connected to the shaft 118a in any suitable manner, including bearings, flanges, couplings, fasteners, welds, seams, joints, or combinations thereof, for example. In some exemplary embodiments of the inventive concepts disclosed herein an actuator mechanism, such as the actuator assembly 110, may be operably coupled with the frame 160, with the shaft 118a, with the support assembly 102a, and combinations thereof, and may rotate the frame 160 relative to the shaft 118a, the support assembly 102a, or combinations thereof.

The frame 160 may have a first side 162 and a second side 164, the first side 162 and the second side 164 oriented substantially parallel to one another, for example. It is to be understood that in some exemplary embodiments of the inventive concepts disclosed herein, the first side 162 and the second side 164 may be angled relative to one another at any desired angle varying from about 0° to about 90°, for example. Further, in some exemplary embodiments the first side 162 or the second side 164 may be omitted.

A rotation plane 166 (FIG. 9) may extend through the frame 160, and may be oriented substantially parallel to the first side 162 and the second side 164, for example. The rotation plane 166 may be oriented substantially vertically relative to a horizontal plane when the frame assembly 104a is in a substantially vertical position, and may be angled relative to the horizontal plane when the frame assembly 104a is in an angled position, for example.

In some exemplary embodiments of the inventive concepts disclosed herein, the frame 160 may be omitted, and the flow path assembly 106a may be connected to the shaft 118a, as will be appreciated by a person of ordinary skill in the art having the benefit of the instant disclosure.

Referring back to FIGS. 3-4, the flow path assembly 106a may be implemented and function similarly to the flow path assembly 106, and may include one or more fluid conduits 122a-n cooperating to define a substantially S-shaped flow path 108a.

The conduits 122a-n may be implemented as described above, and may be in fluid communication with one another so as to cooperate with one another to define the substantially S-shaped flow path 108a, for example. The conduits 122a-n may be connected to the frame 160, so that a first portion of each conduit 122a-n is connected to the first side 162, and a second portion of each conduit 122a-n is connected to the second side 164 of the frame 160, for example.

In the embodiment shown in FIG. 3-4, a portion of each conduit 122a is shown as extending on either side of the plane 166 (FIG. 7) defined by the frame 160. One or more upper bend 170 fluidly connecting two adjacent conduits 122 is shown as intersecting the plane 166 (FIG. 7), and substantially U-shaped bottoms 172 of the conduits 122a are shown as intersecting the plane 166 (FIG. 7), for example. It is to be understood that the upper bends 170 and the bottoms 172 may intersect the plane 166 at any desired angle ranging from about 0° to about 90° in some exemplary embodiments. Further, in some exemplary embodiments, the bends 170 and the bottoms 172 may not intersect the plane 166 (FIG. 7), and may extend along the plane 166, or at a distance from the plane 166 while being substantially coplanar with the plane 166. In some exemplary embodiments, a first bend 170 or a first bottom 172 may intersect the plane 166, and a second bend 170 and a second bottom 172 may be substantially coplanar with the plane 166. Further in other exemplary embodiments, the conduits 122a-n may intersect the plane 166, or may be substantially coplanar with the plane 166 or combinations thereof, such as a first conduit 122a-n intersecting the plane 166, and a second conduit 122a-n being substantially coplanar with the plane 166.

An entry opening 124 may be formed in a first one of the conduits 122a-n, and an exit conduit 126 may be in fluid communication with a second one of the conduits 122a-n, for example, as described above.

One or more alternating first fluid column 140 and second fluid column 142 may be positioned in the conduits 122a-n as described above, for example, so that a first fluid column 140 of the first fluid is trapped between two second fluid columns 142 of the second fluid in the substantially S-shaped flow path 108a, as described above.

The apparatus 100a may be initialized by filling the first portion of the conduits 122a-n positioned on the first side 162 of the frame 160 between about 50% and about 95% full of a first fluid having a first density, while filling the second portion of the conduits 122a-n connected to the second side 164 of the frame 160 between about 5% and about 50% full with the first fluid, for example. In some exemplary embodiments, the first and the second portion of the conduits 122a-n may be filled to any desired volume or amount, such as between about 0% and about 100% full. In some exemplary embodiment, the second fluid may be water, for example, although any suitable first fluid may be used so long as the first fluid has a first density that is higher than a second density of a second fluid as will be described below.

The exact heights of the first fluid columns 142 that each of the conduits 122a-n are filled to, are dependent on the pressure desired to be outputted by the apparatus 100a. This may result in a setup where the pressure in each conduit 122a-n is increasing throughout the flow path 108a, with the initial pressure in the entry opening 124 being atmospheric, and the pressure increasing in each subsequent alternating first fluid column 140 and second fluid column 142, to the desired final pressure at the exit conduit 126, for example.

While the pressure for the initial setup may be created by adding a second fluid (e.g., air or gas) into each conduit 122a-n, the pressure at any point in the substantially S-shaped flow path 108a of the apparatus 100a can easily be measured by looking at the differences in the heights of the liquid in the first portion of the conduit 122a-n connected to the first side 162 of the frame 160 and the second portion of the conduit 122a-n connected to the second side 164 of the frame 160, for example. The initial setup is designed to have enough pressure to feed the desired pressure in the exit conduit 126, while also having enough extra second fluid column 142 height to ensure that during operation the second fluid is not able to flow over the bends 170 of the conduits 122a-n, or for the first fluid to be pushed under the bottoms 172 of the conduits 122a-n, for example.

To set up the apparatus 100a the following procedure may be repeated for each side: Outlet valves (not shown) in fluid communication with the bottoms 172 may be substantially closed, while air valves (not shown) in fluid communication with the bends 170 may be substantially opened.

The apparatus 100a may be positioned in the substantially vertical position as shown in FIG. 3. A volume of the second fluid may be added or removed to the vented conduits 122a-n (e.g., via a port or a valve in fluid communication with each conduit 122a-n), as described above. Vented second fluid levels may be determined by operation of the apparatus 100a, and/or by pre-calculated tables or spreadsheets and may be marked on the conduits 122a-n of the apparatus 100a for reference, in some exemplary embodiments.

At this point, the correct volume of the second fluid is present in the conduits 122a-n, but the first fluid columns 140 are not at the desired pressure. The air valves (not shown) in fluid communication with the bends 170 may be substantially closed.

The apparatus 100a may be positioned in the angled position as shown in FIG. 4 by any suitable actuating mechanism, such as the actuator assembly 110a, as adding a volume of the first fluid at the angled position is least problematic and may assure the minimum pressure desired at the exit conduit 126 is present when the apparatus 100a is in the angled position. First fluid column 140 heights or operational levels may have been pre-established and marked on the conduits 122a-n or in tables or spreadsheets which may indicated where the first fluid column 140 heights for each conduit 122a-n are desired to be at when the apparatus 100a is in the angled position. A volume of the first fluid may be added to each conduit 122a-n, such as via ports or valves in fluid communication with each conduit 122a-n, for example. Alternatively, the first fluid may be added to the apparatus 100a while the apparatus 100a is in the substantially vertical position if careful attention is given to add the first fluid to all conduits 122a-n incrementally.

The risk involved in adding a too large volume of the first fluid in the apparatus 100a is the potential to overcharge one conduit 122a-n, and then have a volume of the first fluid of the second fluid spill over to one or more adjacent conduits 122a-n, for example. As will be appreciated by persons of ordinary skill in the art, because the conduits 122a-n are in fluid communication with one another, adding a volume of the first fluid or the second fluid to any one of the conduits 122a-n affects the pressures and volumes of the first and the second fluid in the remaining conduits 122a-n. Readjustment (adding or removing a volume of the first fluid or the second fluid) may be desired to safely reach the predetermined operational pressure levels and first fluid column 140 and second fluid column 142 heights in each conduit 122a-n, and in the flow path 108a overall. Further, the charged levels of the first fluid columns 140 and the second fluid columns 142 when the apparatus 100a is in the substantially vertical position do not represent the levels during output stroke, such as when a volume of fluid is allowed to flow out of the exit conduit 126, for example.

Once the apparatus 100a is set up, the next consideration is the output resistance. If the exit conduit 126 is opened without any resistance to the flow of fluids therethrough, the pressures inside each of the conduits 122a-n in the apparatus 100a will equalize, and the levels and pressures of the first fluid columns 140 and the second fluid columns 142 in each conduit 122a-n may be readjusted to optimal levels as described above.

After initialization the apparatus 100a is operated by removing a volume of fluid from the exit conduit 126 while the apparatus 100a is in the substantially vertical position (FIG. 3). The actuator assembly 110a is then operated to rotate the apparatus 100a to the angled position (FIG. 4), and a volume of fluid is added back into the exit conduit 126. After the apparatus 100a is returned to the substantially vertical position, the process can be repeated for as long as desired. The apparatus 100a is configured to change the pressure of a fluid between two different values by being moved between the substantially vertical position (FIG. 3) and the angled position (FIG. 4). The pressure change is accomplished by rotating the apparatus 100a from the substantially vertical position to the angled position (e.g., between about 5° and 85°) about the shaft 118a. The exact angle of rotation between the substantially vertical position and the angled position may depend on the difference between the higher and lower pressures desired, for example.

This rotation of the apparatus 100a can be implemented via the actuator assembly 110a. It is to be understood that any suitable actuator mechanism or method may be used to effect the rotation of the apparatus 100a, and the optimal rotation may be dependent on the particular application for which the apparatus 100a is used.

Figure 10:
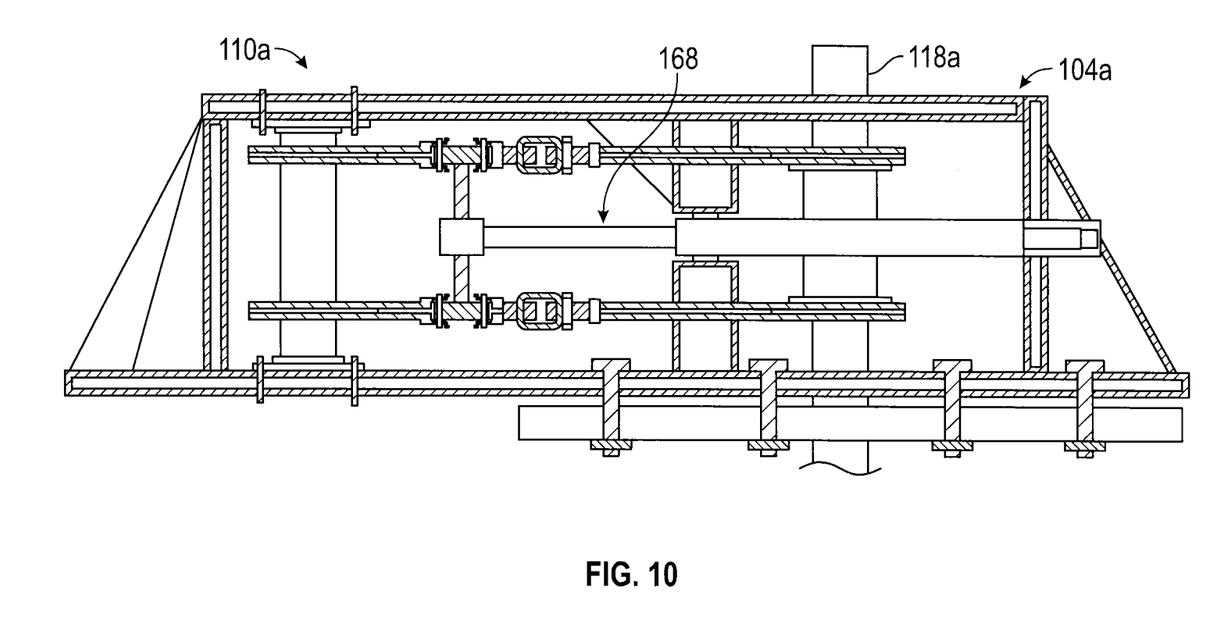
FIG. 10 is a side view diagram of an embodiment of an actuator assembly according to the inventive concepts disclosed herein shown connected to a shaft.

For example, a hydraulic actuator assembly 110a as shown in FIG. 10 may be implemented in some exemplary embodiments of the inventive concepts disclosed herein. The actuator assembly 110a may be connected to the frame assembly 104a and to the shaft 118a of the apparatus 100a, or to the frame assembly 104a, for example. The actuator assembly 110a may include a hydraulic arm 168. Exemplary embodiments of the actuator assembly 110a may also include one or more idler sprocket, drive sprocket (e.g., with a keyway), dual action hydraulic cylinder, drive chains with optional adjustable links for tension, locking collars on the shaft 118a to limit travel, and mounting plate and box frame for actuator assembly 110, for example.

Figure 11A:
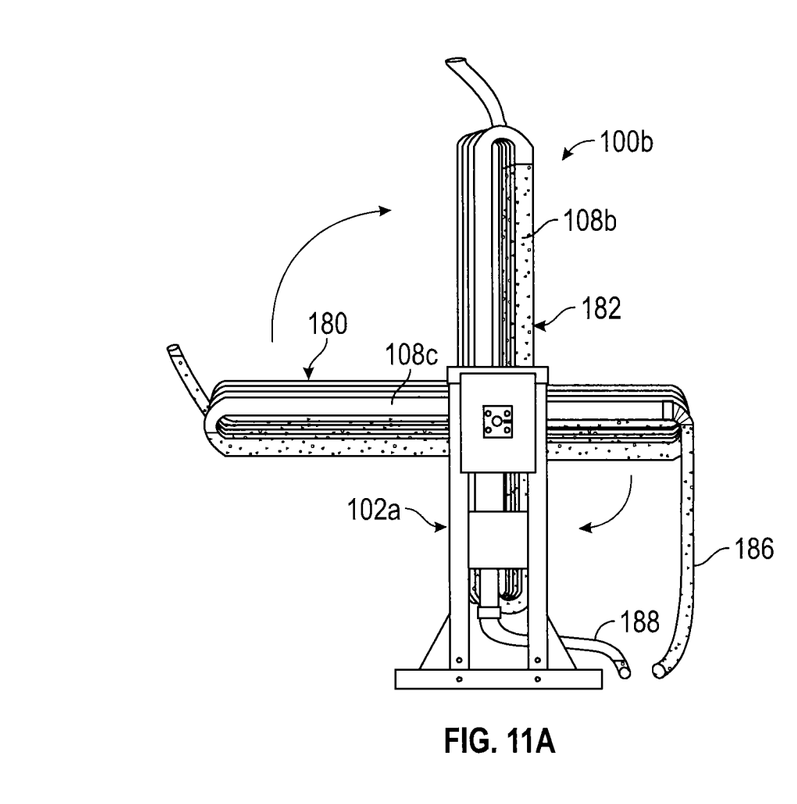
FIG. 11A is a side view diagram of an exemplary embodiment of an apparatus according to the inventive concepts disclosed herein.
Figure 11B:
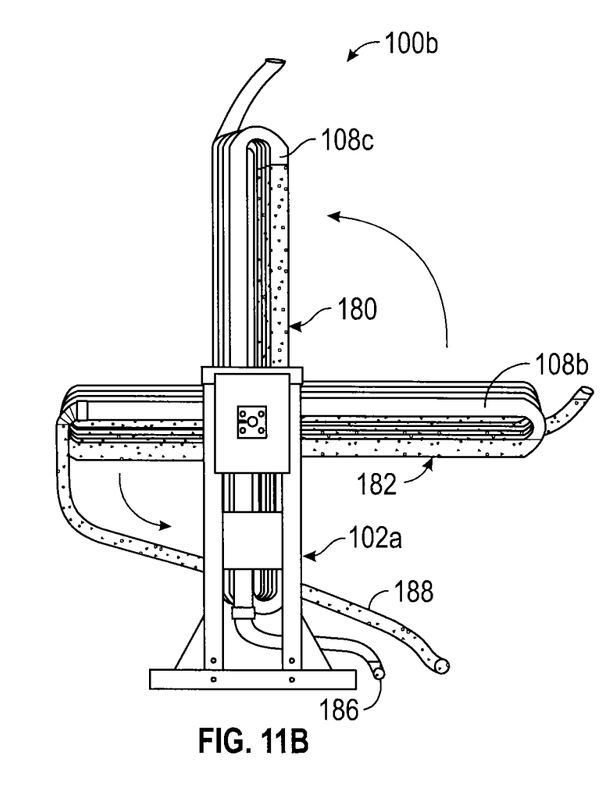
FIG. 11B is a side view diagram of the apparatus of FIG. 11A.

Referring now to FIGS. 11A and 11B, shown therein is an exemplary embodiment of an apparatus 100b according to the inventive concepts disclosed herein. The apparatus 100b may be implemented similarly to the apparatus 100a as described above, and may include a first set 180 of conduits 122a-n and a second set 182 of conduits 122a-n, connected to a support assembly 102a, and offset from one another at an angle of about 90°, for example. It is to be understood that the first set 180 and the second set 182 of conduits 122a-n may be offset from one another at any desired angle varying from about 0° to about 180°, from about 45° to about 135°, from about 70° to about 80°, or combinations and sub-combinations thereof, in some exemplary embodiments. In some exemplary embodiments the first set 180 and the second set 182 of conduits 122*a-n* may be offset from one another at an angle of about 75°, or at any other angle.

The conduits 122*a-n* in the first set 180 may be in fluid communication with one another and may cooperate to define a substantially S-shaped flow path 108*b*, for example. The conduits 122*a-n* in the second set 182 may be in fluid communication with one another and may cooperate to define a substantially S-shaped flow path 108*c*, for example.

The first set 180 may be in fluid communication with a first exit conduit 186, and the second set 182 may be in fluid communication with a second exit conduit 188. The first exit conduit 186 and the second exit conduit 188 may be implemented and function similarly to the exit conduit 126, for example.

The apparatus 100*b* may further include an actuator assembly (not shown), which may be implemented and function similarly to the actuator assembly 110 or the actuator assembly 110*a* as described above, for example.

In operation, the apparatus 100*b* may be set up and initialized as described above with reference to the apparatus 100*a*, for example. The outputs of the first exit conduit 186 and the second exit conduit 188 are desirably kept separate. The orientation of the first set 180 and the second set 182 relative to one another enables the sets 180 and 182 to alternate between a substantially vertical position (e.g., relatively high-pressure) and an angled position (e.g., relatively low-pressure) as the apparatus 100*b* is tilted, so that when the first set 180 is in the substantially vertical position, the second set 182 is in the angled position, and vice versa, for example. This would allow for a volume of fluid to be removed from the set (e.g., 180 or 182) that is in the substantially vertical position, while simultaneously allowing for a volume of fluid to be reintroduced in the set (e.g., 180 or 182) that is in the angled position. This process may be repeated as long as desired, as described above. As will be appreciated by a person or ordinary skill in the art, the apparatus 100*b* may be operated in a forward-reverse direction to alternatively position the first set 180 and the second set 182 in the substantially vertical and the angled positions as indicated by the arrows in FIGS. 11A-11B. However, in some exemplary embodiments, the apparatus 100*b* may be rotated at 180° or at 360° or more as will be described herein below.

Figure 12A:
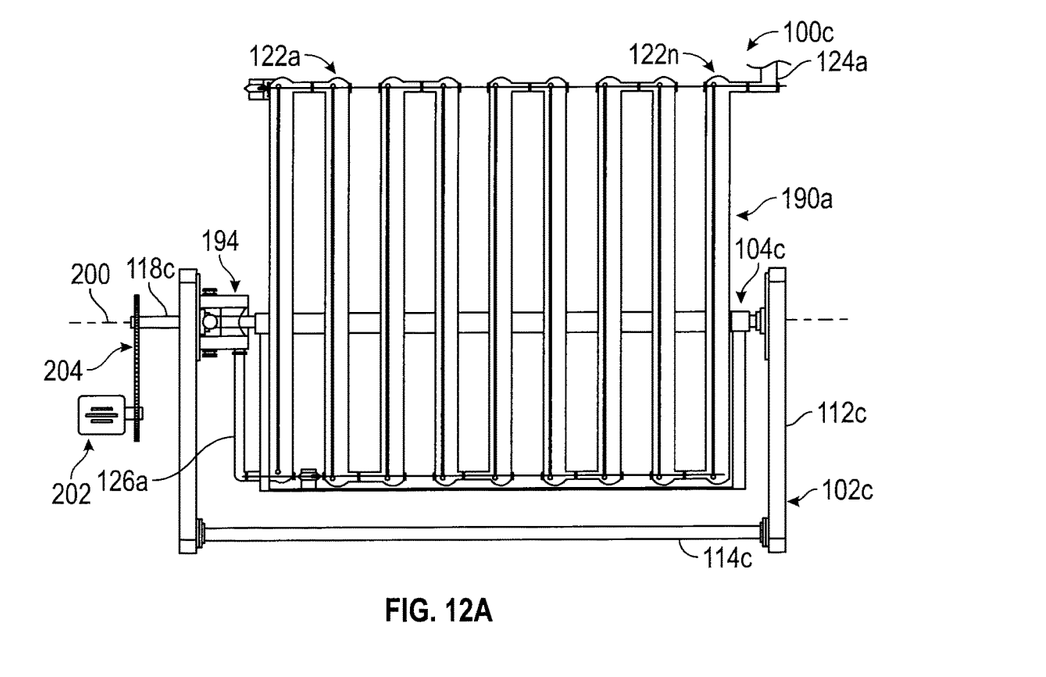
FIG. 12A is a side view diagram of an exemplary embodiment of a rotary apparatus according to the inventive concepts disclosed herein.
Figure 12B:
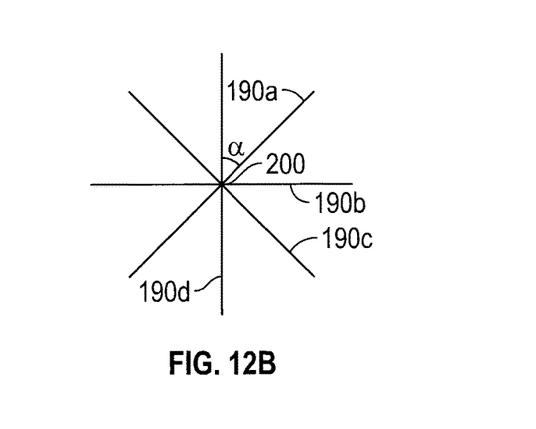
FIG. 12B is a side view diagram of the rotary apparatus of FIG. 12A.

Referring now to FIGS. 12A-12B, an exemplary embodiment of a rotary apparatus 100*c* according to the inventive concepts disclosed herein may be implemented similarly to the apparatus 100*b* described above and may include four sets 190*a-d* of conduits 122*a-n* (with only one set 190*a* shown in FIG. 12A shown for clarity). The four sets 190*a-d* may be attached to a frame assembly 104*c*, and to a support assembly 102*c*, and may be offset from one another at an angle α, which may vary from about 0° to about 45°, for example. As will be appreciated by a person of ordinary skill in the art, a first angle separating a first set 190*a* and a second set 190*b*, and a second angle separating the second set 190*b* and a third set 190*c* may be different, similar, or substantially equal to one another, and combinations thereof. Further, any number of sets 190 may be used with the inventive concepts disclosed herein, such as one, two, three, or more than four sets 190, for example.

The sets 190*a-d* may each include an entry opening 124*a-d* and an exit conduit 126*a-d*. The entry openings 124*a-d*, and the exit conduits 126*a-d* may be implemented and function similarly to the entry opening 124 and the exit conduit 126 respectively, for example.

The exit conduits 126*a-d* are in fluid communication with a manifold 194. The manifold 194 may be implemented as a Dublin union in some exemplary embodiments of the inventive concepts disclosed herein, and may be implemented such that rotational flow of fluid provided from the exit conduits 126*a-d* is diverted between the exit conduits 126*a-d*, for example by utilizing one or more fluid ports (not referenced) configured to divert the flow at any angle, such as an angle varying between about 0° and about 360°, or between about 45° and about 90°, at about 75°, or any combinations and sub-combinations thereof, for example. The manifold 194 may be configured so as to place a first set 190*a* in fluid communication with a third set 190*c*, and a second set 190*b* in a fluid communication with a fourth set 190*d*, for example. It is to be understood that any of the sets 190*a-d* may be in fluid communication with any other sets 190*a-n*, and all sets 190*a-d* may be in fluid communication with one another in some exemplary embodiments.

As will be appreciated by a person of ordinary skill in the art, Dublin unions are standard devices that are configured to allow flow to travel from a rotational object to a stationary object without leaking, such as via maintaining a rotational and sealed fluid connection with the rotational object.

The frame assembly 104*c* may include a shaft 118*c*, and may have an axis 200 extending substantially along the shaft 118*c* in some exemplary embodiments.

An optional generator 202 may be operatively coupled with the shaft 118*c*, such as via a gear system 204, for example, so that rotational motion of the shaft 118 may be converted to electrical energy by the generator 202, for example. The generator 202 may be implemented as any suitable generator 202 such as an electromagnetic motor or generator 202, for example. The gear system 204 may be implemented as any suitable gear system 204 configured to convey mechanical energy from the shaft 118*c* to the generator 202, for example. In some exemplary embodiments, the gear system 204 may be omitted, and any suitable mechanical system may be implemented, such as a belt system, a chain drive system, a camshaft and crankshaft system, a worm drive system, and combinations thereof. Further, in some exemplary embodiments of the inventive concepts disclosed herein a shaft of the generator 202 may be connected to the shaft 118*c*, as will be appreciated by persons of ordinary skill in the art.

An optional braking mechanism (not shown) may be implemented with the inventive concepts disclosed herein, and may be operably coupled with one or more of the shaft 118*c*, the gear system 204, or the generator 202 so as to control the speed at which the shaft 118*c*, the gear system 204, and the generator 202 rotate, for example.

Figure 13A:
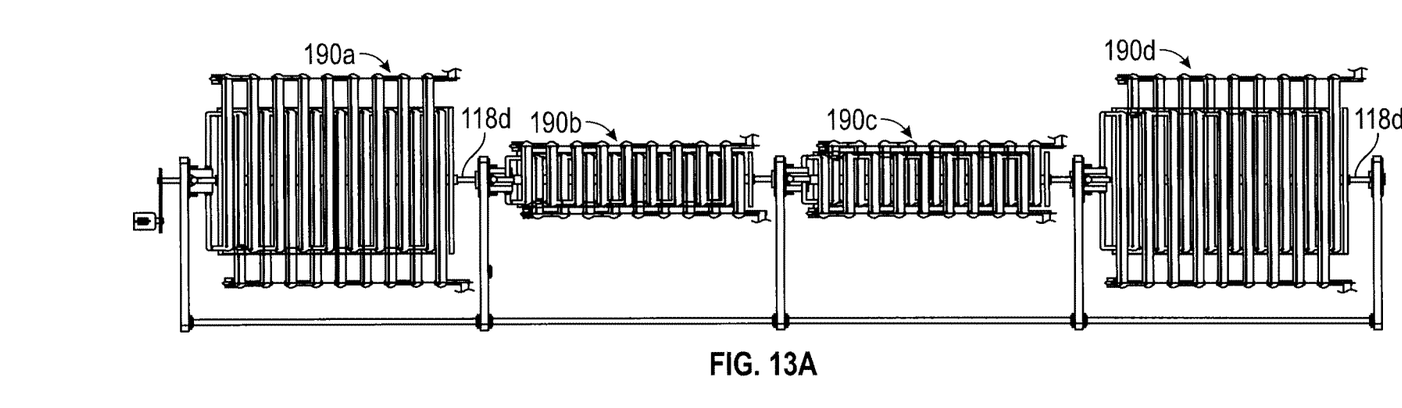
FIG. 13A is a side view diagram of an exemplary embodiment of a rotary apparatus according to the inventive concepts disclosed herein.
Figure 13B:
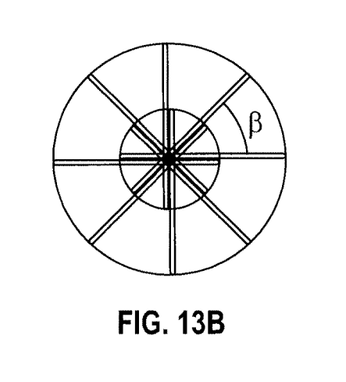
FIG. 13B is a side view diagram of the rotary apparatus of FIG. 13A.

Referring now to FIGS. 13A, in some exemplary embodiments of the inventive concepts shown herein multiple sets 190*a-d* may be positioned along the same shaft 118*d* and may be offset relative to one another at any desired angle 13, which may vary from about 0° to about 360°, for example.

In operation, each set 190*a-d* of the apparatus 100*c* may be set up and may operate similarly to the apparatus 100, 100*a*, or 100*b* above.

The flow of first or second fluids between each of the sets 190*a-d* is restricted (e.g., being mechanical float-checked) at the point the lowest pressure is reached in each of the sets 190*a-c*—this substantially prevents the first and second fluids from blowing over or spilling over, and may also cause an uneven weight distribution to occur during the setup of the apparatus 100*c*.

In some exemplary embodiments, a second manifold such as the manifold 194 may be placed in fluid communication with the entry openings 124*a-d* and may be configured to be accessed during the certain range of rotation, meaning only two fluid ports may be implemented with the second manifold 194, for example.

In the design of exemplary embodiment of an apparatus 100, 100a, 100b, or 100c according to the inventive concepts disclosed herein several design criteria may be useful to ensure that the respective apparatus is configured to fluctuate between a desired high and a low pressure with the desired amount of fluid being removed and without blowing over (e.g., having the second fluid spillover the top of a conduit or the first fluid pass under a conduit).

The height and number of conduits used are related, since they are both used to control the maximum pressure that an apparatus constructed in accordance with the inventive concepts disclosed herein can reach. Since the pressure in an apparatus is a function of the of the vertical fluid column heights, the pressure in a first fluid column can be determined by looking at the summation of the differences between each of the high and low second fluid column heights in each conduit of the S-shaped flow path. This makes it where the total height of an apparatus can be cut down by using multiple conduits to define the S-shaped flow path. For any desired pressure, the total height of an apparatus is inversely proportional to the number of conduits used to define the s-shaped flow path.

The diameter of the substantially S-shaped flow path may be controlled not by the desired pressures, but instead by the volume of a first fluid or a second fluid that is desired to be moved by the apparatus. Since a volume of the first fluid or the second fluid is being removed from the apparatus, this changes the heights of the first and second fluid columns within the apparatus. The effect that this volume change has on the first and second fluid column heights is inversely proportional to the internal diameter of the flow path. But, a larger flow path diameter leads to a heavier apparatus that is harder to operate and is less efficient. Because of this, the diameter of the flow path may be selected to be as small as is available to ensure that the apparatus operates within the desired factor of safety.

In some exemplary embodiments, another desirable design criterion is the angle or radians of rotation of an apparatus constructed according to the inventive concepts disclosed herein. This angle may be designed to control the difference between the high and low pressure inside the substantially S-shaped flow path of the apparatus. As the apparatus tilts or rotates from a substantially vertical position towards an angled position, the vertical fluid column heights of the first fluid and the second fluid are reduced, which causes the pressure inside the flow path to decrease. Since the high pressure is determined by the initial set up of the apparatus, the angle of rotation may be utilized to determine the minimum pressure inside the flow path at which the apparatus may be operated, for example.

An additional issue with some exemplary embodiments of an apparatus according to the inventive concepts disclosed herein that is to be taken into consideration when designing an apparatus is spillover. Spillover can occur in two different ways. The first cause of spillover happens if any of the first fluid column heights are allowed to drop below the bottom bends in the conduits defining the substantially S-shaped flow path. If this happens, a volume of the first fluid may pass from a first conduit to a second adjacent conduit. Spillover can also occur if the second fluid column height in any of the conduits is allowed to rise above the safe limits, and transfer over the top bend from a first conduit to an adjacent second conduit, for example. If either of these spillover conditions occurs the dynamics of the apparatus may be changed and the apparatus may be desirably re-initialized before it performs optimally. Because of this issue, it is important to selecting sizing for a particular apparatus such that the first and the second fluid column heights do not approach the spillover points. Because an apparatus constructed according to the inventive concepts disclosed herein may have varying sizes, volumes, and heights, and may use different first and second fluids, such spillover limits may be empirically determined and clearly marked on the apparatus and/or included with an accompanying manual or set up procedure description, for example.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. An apparatus, comprising:
    a base; and
    a flow path assembly defining a substantially serpentine flow path having an entry opening and an exit opening, the flow path assembly supported by the base so that the flow path assembly is rotatable between a substantially vertical position and an angled position relative to the base,
    wherein the substantially serpentine flow path is configured to allow a column of a first fluid with a first density to be trapped between two columns of a second fluid with a second density higher than the first density, the first fluid column having a first height and the second fluid columns having second heights so that a first volume of the first fluid and a second volume of the second fluid flow in and out the serpentine flow path through the exit opening as the flow path assembly is rotated between the substantially vertical position and the angled position.

2. The apparatus of claim 1, wherein the entry opening is in fluid communication with the atmosphere.

3. The apparatus of claim 1, further comprising a tank fluidly connected to the exit opening and configured to hold the first and second volume of fluid as the first and second fluids are moved through the exit opening.

4. The apparatus of claim 1, wherein the substantially serpentine flow path rotates between about 0° and about 360° relative to the base when the flow path assembly is rotated between the substantially vertical position and the angled position.

5. An apparatus, comprising:
    a base;
    a frame movably supported by the base, the frame having a first side and a second side cooperating to define a rotation plane and a rotation axis extending substantially parallel to the rotation plane, the frame being rotatable between a substantially vertical position and an angled position about the rotation axis;
    a flow path assembly, comprising:
        a first conduit having a first upper end and a first lower end and being connected to the frame so that the first conduit extends substantially vertically when the frame is in the substantially vertical position;

a second conduit having a second upper end and a second lower end and being connected to the frame so that the second conduit extends substantially vertically when the frame is in the substantially vertical position;

a third conduit having a third upper end and a third lower end and being connected to the frame so that the third conduit extends substantially vertically when the frame is in the substantially vertical position;

a fourth conduit having a fourth upper end and a fourth lower end and being connected to the frame so that the fourth conduit extends substantially vertically when the frame is in the substantially vertical position;

a first connector conduit fluidly connected with the first lower end of the first conduit and the second lower end of the second conduit, the first connector conduit having a first fluid passage formed therein and configured to allow one or more fluids to be introduced into, or removed from, the first and the second conduits;

a second connector conduit fluidly connected with the second upper end of the second fluid conduit and the third upper end of the third conduit, the second connector conduit having a second fluid passage formed therein and configured to allow one or more fluids to be introduced into or removed from the second connector conduit;

a third connector conduit fluidly connected with the third lower end of the third conduit and the fourth lower end of the fourth conduit, the third connector conduit having a third fluid passage formed therein and configured to allow one or more fluids to be introduced into or removed from the third connector conduit; and an exit conduit fluidly connected with the fourth upper end such that the first, second, third, and fourth conduits, the first, second, and third connector conduits, and the exit conduit, cooperate to define a substantially serpentine flow path; and wherein the substantially serpentine flow path is configured to allow a column of a first fluid with a first density to be trapped between two columns of a second fluid with a second density higher than the first density, the first fluid column having a first height and the second fluid columns having second heights, so that a first volume of the first fluid and a second volume of the second fluid flow in and out the serpentine flow path through the exit conduit as the frame is rotated between the substantially vertical position and the angled position.

6. The apparatus of claim 5, wherein the first upper end of the first conduit is in fluid communication with the atmosphere.

7. The apparatus of claim 5, further comprising a tank fluidly connected to the exit conduit and configured to hold the first and second volume of fluid as the first and second fluids are moved through the exit conduit.

8. The apparatus of claim 5, wherein the first and the third conduits are connected to the first side of the frame, and the second and fourth conduits are connected to the second side of the frame.

9. The apparatus of claim 8, wherein the first, second, and third connector conduits and the exit conduit extend through the plane defined by the first and the second side of the frame.

10. The apparatus of claim 5, further comprising:
a first column of the first fluid positioned in the first conduit;
a first column of a second fluid positioned at least partially in the first conduit and in the first connector conduit;
a second column of the first fluid positioned in the second connector conduit and at least partially into the second conduit, the first connector conduit, and the third conduit;
a second column of the second fluid positioned at least partially in the second conduit and at least partially in the third connector conduit;
a third column of the first fluid positioned at least partially into the third conduit and at least partially into the fourth conduit; and
wherein the substantially serpentine flow path is configured to allow the third column of the first fluid to be trapped between the first and second columns of the second fluid, so that a first volume of the first fluid and a second volume of the second fluid through the serpentine flow path as the frame is rotated between the substantially vertical position and the angled position.

11. The apparatus of claim 5, wherein the substantially vertical position and the angled position are separated by an angle ranging between about 0° and about 45°.

12. The apparatus of claim 5, wherein the substantially vertical position and the angled position are separated by an angle ranging between about 0° and about 360°.

13. The apparatus of claim 5, wherein the substantially vertical position and the angled position are separated by an angle ranging between about 0° and about 180°.

* * * * *

UNITED STATES PATENT AND TRADEMARK OFFICE
CERTIFICATE OF CORRECTION

PATENT NO.        : 9,752,554 B2                                    Page 1 of 1
APPLICATION NO.   : 15/082452
DATED             : September 5, 2017
INVENTOR(S)       : Wayne S. Travis et al.

It is certified that error appears in the above-identified patent and that said Letters Patent is hereby corrected as shown below:

In the Specification
Column 16, Line 53: After "angle" delete "13," and replace with -- β, --

Signed and Sealed this
Tenth Day of October, 2017

Joseph Matal
*Performing the Functions and Duties of the*
*Under Secretary of Commerce for Intellectual Property and*
*Director of the United States Patent and Trademark Office*